United States Patent
Jain et al.

(10) Patent No.: US 7,680,503 B2
(45) Date of Patent: Mar. 16, 2010

(54) METHOD AND APPARATUS FOR EFFECTING SMS AND SMSC MESSAGING IN DIFFERENT CELLULAR COMMUNICATIONS SYSTEMS

(75) Inventors: Nikhil Jain, San Diego, CA (US); Thadi Nagaraj, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 963 days.

(21) Appl. No.: 10/421,439

(22) Filed: Apr. 22, 2003

(65) Prior Publication Data

US 2003/0224811 A1    Dec. 4, 2003

Related U.S. Application Data

(60) Provisional application No. 60/374,980, filed on Apr. 22, 2002.

(51) Int. Cl.
    *H04W 4/00*    (2009.01)
(52) U.S. Cl. .................... 455/466; 455/432.2
(58) Field of Classification Search ............. 455/466, 455/432.2, 433, 519; 707/201; 709/206, 709/219; 701/213; 370/356; 379/88.14
    See application file for complete search history.

(56) References Cited

U.S. PATENT DOCUMENTS

| | | | |
|---|---|---|---|
| 4,901,307 A | | 2/1990 | Gilhousen et al. |
| 6,321,257 B1 * | | 11/2001 | Kotola et al. ............. 709/219 |
| 6,587,693 B1 * | | 7/2003 | Lumme et al. ............ 455/466 |
| 6,668,167 B2 * | | 12/2003 | McDowell et al. .......... 455/433 |
| 6,681,111 B2 * | | 1/2004 | Ahn et al. ................ 455/432.2 |
| 6,745,041 B2 * | | 6/2004 | Allison et al. ............. 455/466 |
| 6,810,405 B1 * | | 10/2004 | LaRue et al. .............. 707/201 |
| 7,096,033 B1 * | | 8/2006 | Bell ....................... 455/519 |
| 2001/0017914 A1 * | | 8/2001 | Fortman .................. 379/88.14 |
| 2002/0061745 A1 | | 5/2002 | Ahn et al. |
| 2002/0112014 A1 * | | 8/2002 | Bennett et al. ............. 709/206 |
| 2002/0173320 A1 | | 11/2002 | Aitken et al. |

(Continued)

FOREIGN PATENT DOCUMENTS

CN    1310537    8/2001

(Continued)

OTHER PUBLICATIONS

Heeseon Lim et al: "Interworking of SMS between GSM based GMPCS system and IS-41 based cellular system using I-SMC" Wireless Communications and Networking Conerence, LA, USA Sep. 21-24, 1999, Piscataway, NJ, USA, IEEE, US, Sep. 21, 1999, pp. 1432-.

(Continued)

*Primary Examiner*—Thjuan K Addy
(74) *Attorney, Agent, or Firm*—Sindip (Micky) S. Minhas; Florin Corie (57) ABSTRACT

An apparatus and method of mapping a short message service (SMS) information from a first communications system to a corresponding message in a second, different cellular system is claimed. SMS information having a format required by the first communication system is received. The SMS information is mapped into a format required by the second communication system. Additional information is appended, if necessary, or information is removed as being extraneous information, if necessary, as required by the second communication system.

28 Claims, 3 Drawing Sheets

U.S. PATENT DOCUMENTS

| | | | |
|---|---|---|---|
| 2002/0183081 A1* | 12/2002 | Elizondo Alvarez | ........ 455/466 |
| 2003/0114155 A1 | 6/2003 | Jain et al. | |
| 2003/0133425 A1 | 7/2003 | Radhakrishnan et al. | |
| 2003/0149527 A1* | 8/2003 | Sikila | .......................... 701/213 |
| 2005/0083918 A1* | 4/2005 | Tian | ........................... 370/356 |

FOREIGN PATENT DOCUMENTS

| | | |
|---|---|---|
| EP | 0936825 | 8/1999 |
| JP | 11331956 | 11/1999 |
| JP | 2003510915 | 2/2003 |
| WO | 01022752 | 3/2001 |

OTHER PUBLICATIONS

International Search Report - PCT/US03/12194 - International Search Atuhority - US - Aug. 11, 2003.
International Preliminary Examination Report - PCT/US03/12194 - IPEA/US - Feb. 2, 2004.
Supplementary European Search Report - EP03721789 - European Search Authority - Munich - Jul. 23, 2009.

* cited by examiner

METHOD AND APPARATUS FOR EFFECTING SMS AND SMSC MESSAGING IN DIFFERENT CELLULAR COMMUNICATIONS SYSTEMS

CROSS-REFERENCE TO RELATED APPLICATION

This application claims the benefit of priority of U.S. Provisional Patent Application No. 60/374,980, filed Apr. 22, 2002, which application is contained herein by reference.

BACKGROUND OF THE INVENTION

I. Field of the Invention

The present invention generally relates to wireless communications. More specifically, the present invention relates to a method of and apparatus for providing short message services in different cellular communications systems.

II. Description of the Related Art

Code division multiple access (CDMA) modulation is but one of several techniques for facilitating communications in which a large number of system users are present. Although other techniques, such as time division multiple access (TDMA), frequency division multiple access (FDMA), the global system for mobile communications (GSM) and AM modulation schemes such as amplitude companded single sideband (ACSSB) are also available, CDMA has significant advantages over these other modulation techniques. The use of CDMA techniques in a multiple access communication system is disclosed in U.S. Pat. No. 4,901,307, entitled "Spread Spectrum Multiple Access Communication System Using Satellite Or Terrestrial Repeaters", assigned to the present assignee, the disclosure of which is incorporated herein by reference.

In U.S. Pat. No. 4,901,307 a multiple access technique is described in which a large number of mobile telephone system users, each having a transceiver, communicate through satellite repeaters or terrestrial base stations (also known as cell base stations, or cell-sites) using code division multiple access (CDMA) spread spectrum communication signals. In using CDMA communications, the frequency spectrum can be reused multiple times thus permitting an increase in system user capacity. The use of CDMA techniques results in a much higher spectral efficiency than can be achieved using other multiple access techniques.

In conventional cellular telephone systems the available frequency band is divided into channels typically 30 KHz in bandwidth while analog FM modulation techniques are used. The system service area is divided geographically into cells of varying size. The available frequency channels are divided into sets with each set usually containing an equal number of channels. The frequency sets are assigned to cells in such a way as to minimize the possibility of co-channel interference. For example, consider a system in which there are seven frequency sets and the cells are equal size hexagons. A frequency set used in one cell will not be used in the six nearest or surrounding neighbors of that cell. Furthermore, the frequency set in one cell will not be used in the twelve next nearest neighbors of that cell.

A more difficult situation is presented by movement of the mobile station into a cell serviced by a base station from another cellular system. One complicating factor in such "intersystem" handoffs is that the neighboring cellular system often has dissimilar characteristics. For example, adjacent cellular systems will often operate at different frequencies, and may maintain different levels of base station output power or pilot strength. Further, adjacent cellular systems may require different messaging structures, even for similar types of messages.

For example, the so-called GSM standard has no mechanism for a soft handoff. There is, therefore, a problem in handing off a call using the air interface from a CDMA network to a GSM network. Furthermore, GSM authentication cannot be done because the CDMA 2000 mechanisms cannot transfer the data required to do GSM authentication. Encryption in GSM is different than the encryption in CDMA 2000.

In another example, there is a problem in that there is currently no mechanism for handing SMS and SMSC information using the air interface from a CDMA network to a GSM network. That is, when an SMS message is sent from the mobile, the network needs to know the SMSC address to send the SMS message. Similarly, standard GSM SMSC information cannot be transferred because the CDMA mechanisms cannot transfer the data required to handle GSM SMSC address information. Moreover, standard CDMA SMS message formats (IS-637) cannot be handled by a standard GSM network, because GSM mechanisms cannot transfer the data required to handle standard CDMA SMS messaging.

One way of dealing with this problem would be to modify GSM to enable it to effect handoff to a non-GSM system, e.g. a CDMA system. Another way of dealing with this problem is to modify CDMA to handle traditional SMSC messaging. However, both CDMA and GSM are well established systems, relatively speaking, and operators and equipment providers are reluctant to make expensive modifications to existing equipment in order to accommodate a neighbouring incompatible system. If new messages are added to the air interface in support of dual-mode mobile stations, then modifications must be made to support these new messages using existing hardware. Plainly, this is undesirable form the perspective of the operator and of the equipment provider.

SUMMARY OF THE INVENTION

The invention addresses the above-discussed problems.

In a GSM network, SMS messages sent from a mobile station are addressed to a destination SMS service center. This service center is available from the GSM SIM card, from a previously received SMS message, or as an input from the user. The SMSC address is used by the GSM MSC to route the message to the appropriate SMSC.

There is, however, a problem in that there is currently no mechanism for handing SMS and SMSC messaging using the air interface from a CDMA network to a GSM network. GSM SMSC messaging cannot be done because the CDMA mechanisms cannot transfer the data required to handle GSM SMSC messaging. Similarly, standard CDMA SMS message formats (IS-637) cannot be handled by a standard GSM network, because GSM mechanisms cannot transfer the data required to handle standard CDMA SMS messaging.

A solution to this problem is to include SMSC addressing and appropriate translation of CDMA SMS messaging such that the GSM service network 140 receives the SMSC message in a standard GSM format and structure. That is, it is transparent to the GSM core network 120 that the original SMS message arrived through the CDMA air interface and was modified by hybrid MSN 132. Similarly, a solution to the problem further translates standard GSM SMSC messages into SMS messages as understood by the CDMA air interface. As such, it is again transparent to the GSM core network 120 that the SMSC information is being converted into standard CDMA SMS messaging and destined to a CDMA based mobile station.

According to one aspect of the invention there is provided a method of mapping short message service (SMS) information from a first communications system to a corresponding message in a second, different cellular system. The method comprises receiving SMS information having a format required by the first communication system, mapping the SMS information into a format required by the second communication system; and appending additional information, if necessary, or removing extraneous information, if necessary, as required by the second communication system. In an embodiment, the first cellular communications system is a CDMA system and the second cellular communications system is a GSM system.

The above and further features of the invention are set forth with particularity in the appended claims and together with advantages thereof will become clearer from consideration of the following detailed description of an exemplary embodiment of the invention given with reference to the accompanying drawings.

DETAILED DESCRIPTION OF AN EMBODIMENT OF THE INVENTION

Figure 1:
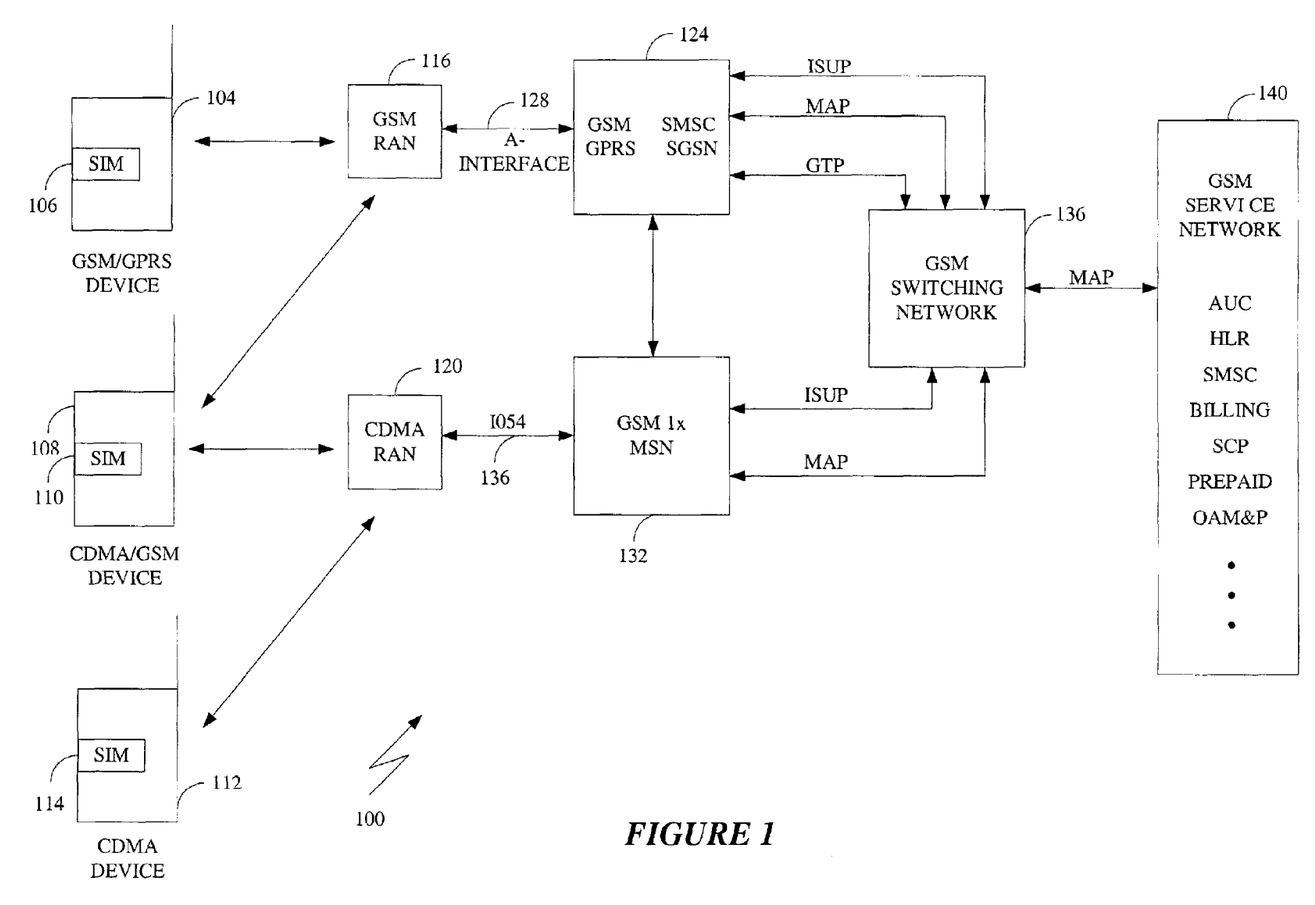
FIG. 1 illustrates a schematic representation of a hybrid cellular system.

FIG. 1 is a schematic illustration of an exemplary cellular telephone system 100. The illustrated system may utilize any of various multiple access modulation techniques for facilitating communications between a typically large number of system mobile stations or mobile telephones, and the base stations. Such multiple access communication system techniques include: time division multiple access (TDMA), global system for mobile communications (GSM), General Packet Radio Service (GPRS), High Speed Circuit Switched Data (iDEN), frequency division multiple access (FDMA), code division multiple access (CDMA), TS code division multiple access (TSCDMA) orthogonal frequency division multiplexing (OFDM) and AM modulation schemes such as amplitude companded single sideband.

For purposes of illustration, FIG. 1 describes the communications system as a combination of a CDMA based system and a GSM based system. It should be understood that any two communications systems may be employed, such as the communications systems discussed above.

Mobile station 104 exemplifies a GSM/GPRS device, having a subscriber identity module 106. Mobile station 108 exemplifies a GSM/CDMA2001× device, having a subscriber identity module 110. Mobile station 108 may be equipped with hardware and/or software modifications from traditional GSM or CDMA mobile stations, rendering the device to interface with both GSM and CDMA infrastructure. Mobile station 112 exemplifies a CDMA20001× device, having a subscriber identity module 114.

Mobile stations 104, 108 and 122 are wireless communication devices, such as mobile telephone, a personal digital assistant, computer or other wireless device capable of wireless communication of voice or data information. The SIM cards 106, 110, and 114 may be a standard GSM SIM card that is operable in a CDMA 1× handset, capable of receiving and reacting to signals from base stations within both CDMA and GSM cellular systems. Such a GSM SIM card 108 integrated with a CDMA1× handset is discussed in U.S. Provisional Patent Application No. 60/350,829, filed Jan. 17, 2002, and U.S. Provisional Patent Application No. 60/354,086, filed Feb. 1, 2002, both converted to U.S. patent application Ser. No. 10,076,831, filed Feb. 14, 2002, assigned to the same assignee as the present application, and is specifically enclosed by reference herein. The SIM cards 106, 110, and 114 may also be a specialized SIM card configured to operate in more than one wireless communication system.

Mobile station 104 is communicably coupled with radio access network (RAN) 116. In an embodiment, RAN 116 is a standard GSM or GSM/GPRS RAN, comprising standard GSM based base transceiver sub-system(s) (BTS) and a standard GSM base station controller (BSC) (not shown).

Mobile stations 108 and 112 are communicably coupled with radio access network (RAN) 120. Mobile station 108 may be communicably coupled with both RAN 116 and RAN 120. In an embodiment, RAN 120 is a CDMA1× RAN as described in U.S. Provisional Patent Application No. 60/340, 356, filed Dec. 14, 2001, converted to U.S. patent application Ser. No. 10/077,556, filed Feb. 14, 2001, assigned to the same assignee as the present application, and is specifically enclosed by reference herein. RAN 120 is a standard CDMA2000 or CDMA 20001× RAN, comprising standard CDMA-based base transceiver sub-system(s) (BTS) and a standard CDMA-based base station controller (BSC) (not shown).

GSM RAN 116 is coupled to a GSM SMSC/SGSN 124, over an A-interface 128. The GSM SMSC/SGSN 124 is coupled to a GSM switching network 132, using MAP, ISUP, and GTP interfaces and protocols.

CDMA RAN 120 is coupled to a GSM1× mobile switching node (MSN) 132, over a standard IOS4 interface/protocol 136. MSN 132 is preferably a hybrid MSN that is coupled to both RAN 112 and GSM switching network 136. GSM switching network 136 is coupled to the remainder of a GSM service network 140. MSN 132 is capable of communicating to both RAN 112 and GSM service network 140 by mapping messages expected in formats and structures in one cellular communication systems to formats and structures in a second cellular communication system. For example, if one communication system is a GSM system, and the second communication system is a CDMA2000-1× system, hybrid MSM 132 maps messages from formats and structures known in the GSM system to that known in a CDMA1× system, and vice-versa.

In a GSM network, SMS messages sent from a mobile station are addressed to a destination SMS service center. This service center is available from the GSM SIM card, from a previously received SMS message, or as an input from the user. The SMSC address is used by the GSM MSC to route the message to the appropriate SMSC.

There is, however, a problem in that there is currently no mechanism for handing SMS and SMSC messaging using the air interface from a CDMA network to a GSM network. GSM SMSC messaging cannot be done because the CDMA mechanisms cannot transfer the data required to handle GSM SMSC messaging. Similarly, standard CDMA SMS message formats (IS-637) cannot be handled by a standard GSM network, because GSM mechanisms cannot transfer the data required to handle standard CDMA SMS messaging.

For example, when a mobile originated SMS message is sent from a mobile station to the infrastructure network, the network needs to know which SMSC to send the SMS message. Similarly, when the mobile station sends an SMS acknowledge message, the network needs to know the SMSC address to which the acknowledge should be forwarded. This information is present in the GSM SIM card but cannot be sent over the air interface, because CDMA 2000 1× SMS formats do not provide a mechanism to include the SMSC address in SMS messages. Therefore, the MSC 116 must modify the SMS messages to include the SMSC address.

If new messages or new formats are added to the air interface in support of dual-mode mobile stations, then modifications must be made to support these new messages. This is undesirable.

A solution to this problem is to include SMSC addressing and appropriate translation of CDMA SMS messaging such that the GSM service network 140 receives the SMSC message in a standard GSM format and structure. That is, it is transparent to the GSM core network 120 that the original SMS message arrived through the CDMA air interface and was modified by hybrid MSN 132. Similarly, a solution to the problem further translates standard GSM SMSC messages into SMS messages as understood by the CDMA air interface. As such, it is again transparent to the GSM core network 120 that the SMSC information is being converted into standard CDMA SMS messaging and destined to a CDMA based mobile station.

Figure 2A:
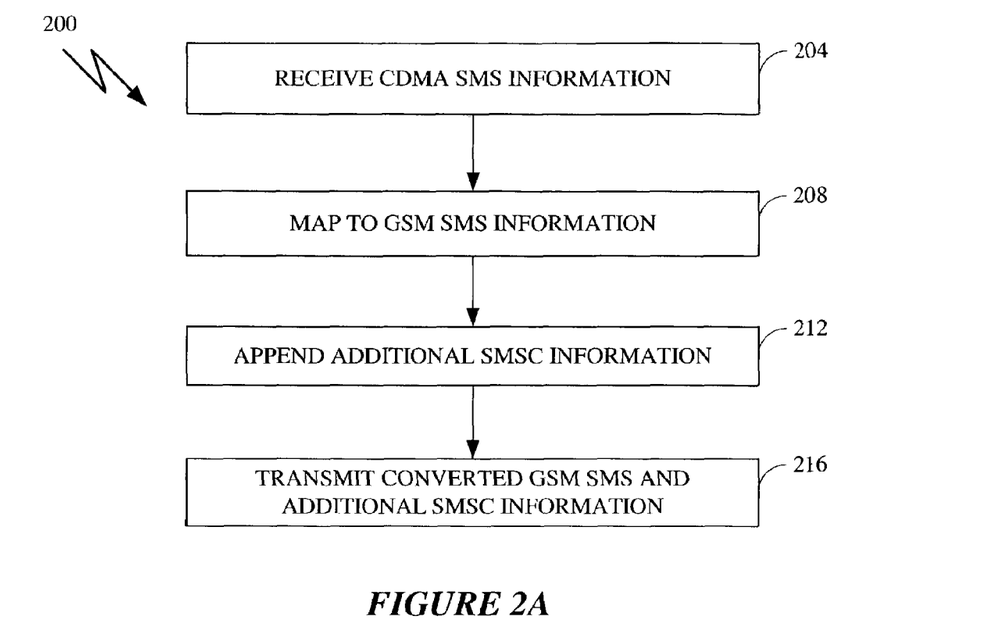
FIG. 2a is a flowchart illustrating conversion of a CDMA SMS message to a GSM SMS and SMSC message.

FIG. 2*a* illustrates the process 200 undergone to convert CDMA SMS messaging to GSM SMSC messaging. A CDMA SMS messaging is received 204, by the MSN 132 from a mobile station. The CDMA SMS information is then mapped 208 into a format recognized by GSM systems, that is, GSM SMS information. This may be insufficient, however, as GSM systems may require an additional SMSC address field. Thus, the additional SMSC address is appended 212 by the MSN 132. Then, the mapped GSM SMS information, with the additional SMSC address information (as necessary), and is transmitted 216.

In embedding the SMSC address into an SMS address field, the SMSC address is preserved and transparently extended. Accordingly, CDMA base stations may transparently route SMS messages without requiring any modifications. Further, the presence or absence of the SMSC address allows the mobile station 104 and the MSC 116 to determine from where the message originated.

Figure 2B:
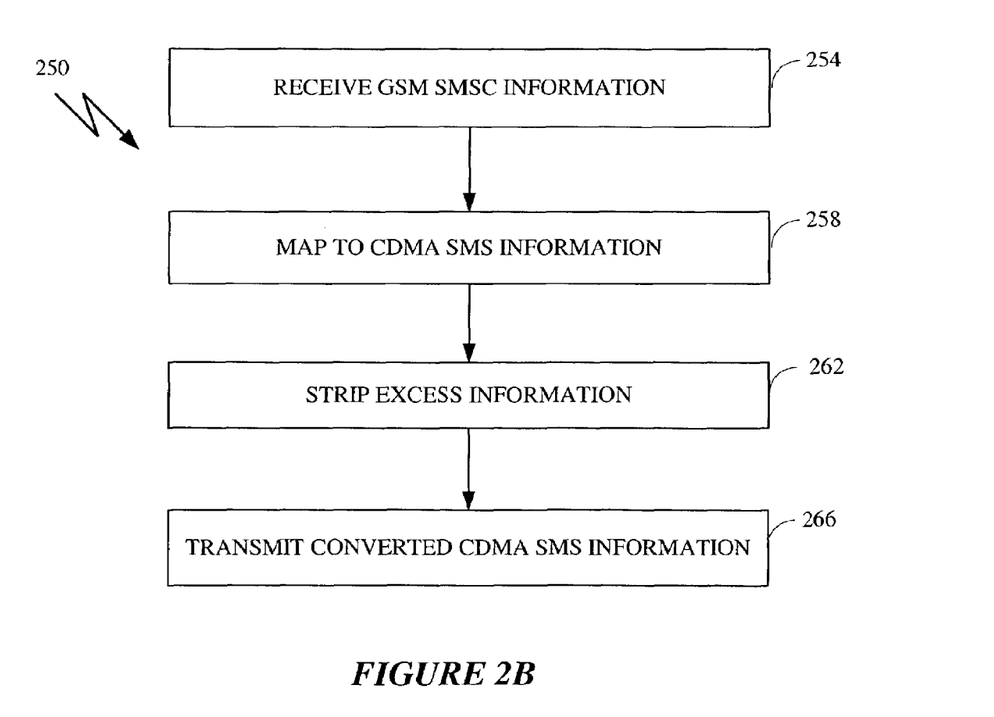
FIG. 2b is a flowchart illustrating conversion of an GSM SMS sand SMSC message to a CDMA SMS message.

FIG. 2*b* illustrates the process 250 undergone to convert GSM SMSC messaging to CDMA SMS messaging. GSM SMSC information is received 254. The GSM SMSC information is then mapped 258 into CDMA SMS information. This is excessive, however, as CDMA systems do not require the SMSC address field. Thus, the additional SMSC address is stripped 262. Then, the mapped CDMA SMS information is transmitted 266.

Figure 3:
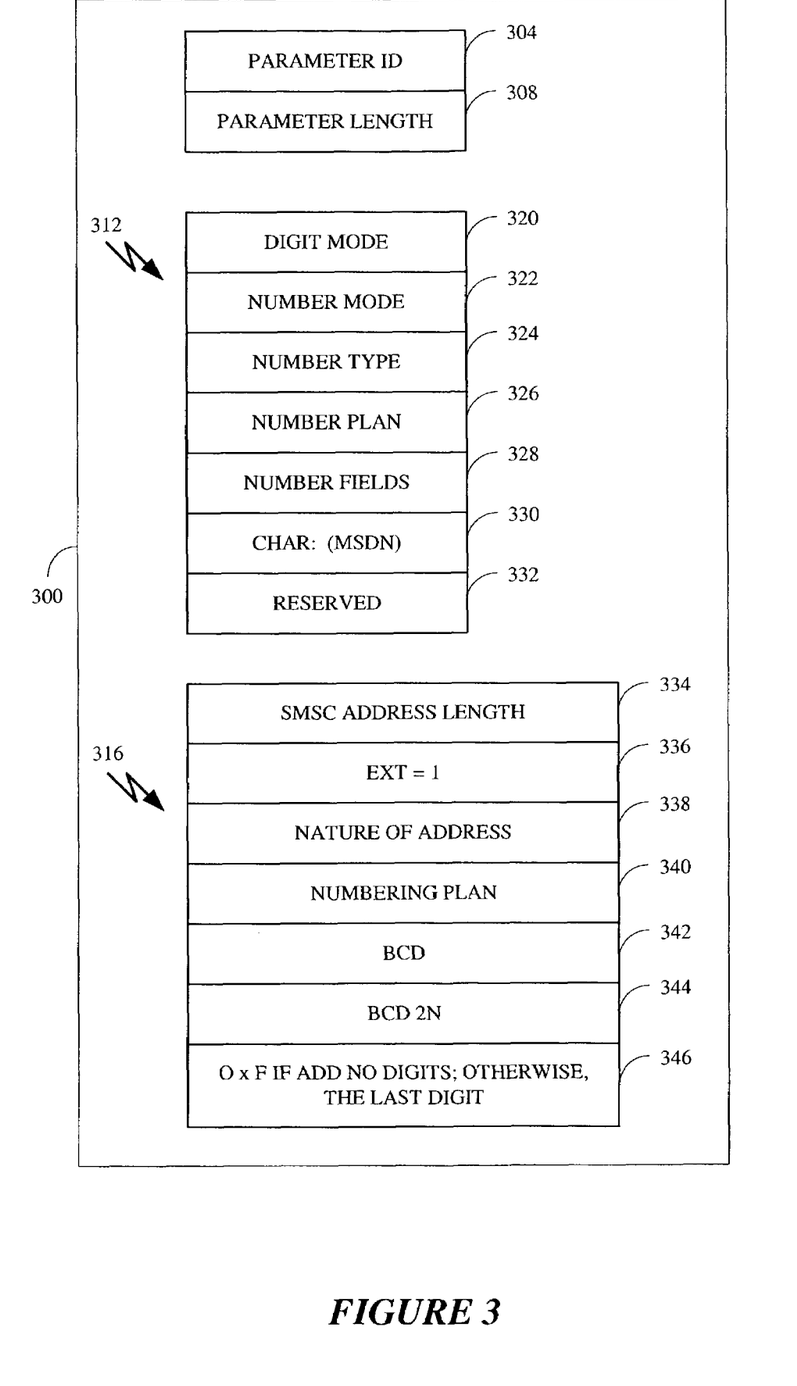
FIG. 3 is a block diagram SMS and SMSC messaging between different cellular communication systems.

Mobile originated SMS messages include the destination address that is the address of the entity to which the SMS message is directed. The destination address field is then augmented with the SMSC address. FIG. 3 illustrates the SMS message components 300. The SMS messaging components comprises a parameter identifier field 304, a parameter length field 308, an originating or destination address portion 312, and the SMSC address portion 316.

An iDEN system utilizes a GSM based MAP interface protocol. As such, SMS messages may be translated, or mapped, in much the same manner described above.

In an embodiment, the parameter identifier 304 may be a message sent from the mobile station. The parameter length 308 is the size (in bytes) of all the fields that follow. In an embodiment, the destination address 312 is on the transport layer and the SMSC address portion 316 is on the relay layer. The destination address 312 comprises a number of fields, including the digit mode 320, number mode 322, number type 324, number plan 326, number fields 328, Chari 330, and reserved field 332.

The SMSC address portion 316 is conditional, and comprises an SMSC address length field 334, an extension field 336, a nature of address field 338, a numbering plan field 340, a BCD field 342, and BCD2N field 344, a 0×F field 346.

Based on the digit mode 320, number mode 322, number type 324, number plan 326, the size of each Chari 330 is determined. The number fields 328 indicates the number of Chari fields 330. Therefore, the size of the conventional destination address field may be determined by the mobile station. If the size is less than the parameter length 308, the mobile station determines that there is an SMS address attached to the destination address parameter. The mobile station may then proceed to process the remainder of the destination address parameter and determine the SMSC address.

In an embodiment, if there is no SMSC address present in the SIM at the mobile station, or if there is no SMSC address available to be inserted into the SMS message, the mobile station inserts a default value. If the MSN receives an SMS message with the default value, the MSN forwards the SMS message to a default SMSC (if any). Thus, the presence of the SMSC address length field shall also indicate to the MSN that the mobile station is a GSM1× mobile station and that the user data field is appropriately encoded. If the SMS message is received without a SMSC address, however, the MSN considers the SMS message to be a CDMA SMS message (IS-637) and process it accordingly.

An apparatus for converting short message service (SMS) information from a first communications system to a corresponding message in a second, different cellular system is also described. The apparatus may be a part of the MSN. The apparatus comprises an input configured to receive SMS information having a format required by the first communication system, a mapper coupled to the input to map the SMS information into a format required by the second communication system, and an appender/remover element coupled to the mapper, configured to append additional information, if necessary, or remove extraneous information, if necessary, as required by the second communication system.

Thus, a novel and improved method and apparatus for the interoperability of SMS messaging between communications systems has been described. Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a subscriber unit. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method of mapping short message service (SMS) information from a first cellular communications system to a corresponding message in a second, different cellular communications system, comprising:
   receiving the SMS information having a format required by the first cellular communications system;
   mapping the SMS information into a format required by the second cellular communications system; and
   appending additional information to the SMS information, if necessary, or removing extraneous information from the SMS information, if necessary, as required by the second cellular communications system;
   wherein appending further comprises determining a size of a destination address field in the received SMS information, and appending or not appending based on the size of the destination address field.

2. The method as set forth in claim 1, wherein said first cellular communications system is a CDMA system.

3. The method as set forth in claim 2, wherein said second cellular communications system is a GSM system.

4. The method as set forth in claim 2, wherein the second cellular communications system is an iDEN system.

5. An apparatus for converting short message service (SMS) information from a first cellular communications system to a corresponding message in a second, different cellular communications system, the apparatus comprising:
   an input configured to receive the SMS information having a format required by the first cellular communications system;
   a processor, coupled to the input, configured to map the SMS information into a format required by the second cellular communications system; and
   an appender/remover element coupled to the processor, configured to append additional information to the SMS information, if necessary, or remove extraneous information from the SMS information, if necessary, into a format as required by the second cellular communications system;
   wherein the appender/remover element is further configured to determine a size of a destination address field in the received SMS information, and to append or not append based on the size of the destination address field.

6. The apparatus as set forth in claim 5, wherein said first cellular communications system is a ODMA system.

7. The apparatus as set forth in claim 6, wherein said second cellular communications system is a OSM system.

8. The apparatus as set forth in claim 6, wherein the second cellular communications system is an iDEN system.

9. An apparatus for mapping short message service (SMS) information from a first cellular communications system to a corresponding message in a second, different cellular communications system, the apparatus comprising:
   means for receiving the SMS information having a format required by the first cellular communications system;
   means for mapping the SMS information into a format required by the second cellular communications system; and
   means for appending additional information to the SMS information, if necessary, or removing extraneous information from the SMS information, if necessary, as required by the second cellular communications system;
   wherein the means for appending or removing further comprises means for determining a size of a destination address field in the received SMS information, and wherein the means for appending or removing is configured to append or not append based on the size of the destination address field.

10. The apparatus as set forth in claim 9, wherein said first cellular communications system is a CDMA system.

11. The apparatus as set forth in claim 10, wherein said second cellular communications system is a GSM system.

12. The apparatus as set forth in claim 10 wherein the second cellular communications system is an iDEN system.

13. A method of determining how to process an SMS message, comprising:
   receiving an SMS message;
   determining the size of a conventional destination address field;
   determining the size of a parameter length;
   comparing the size of the convention destination address field with the parameter length;
   processing the SMS message according to a first format required by a first cellular communication system if the size of the destination address is less than the size of the parameter length; and processing the SMS message according to a second format required by a second cellular communication system if the size of the destination address is not less than the size of the parameter length.

14. The method as set forth in claim 13, further comprising determining that an SMS address field is appended to the destination address field.

15. An apparatus for determining how to process an SMS message, comprising:
   means for determining the size of a conventional destination address field; means for determining the size of a parameter length;
   means for comparing the size of the convention destination address field with the parameter length;
   means for processing the SMS message according to a first format required by a first cellular communication system if the size of the destination address is less than the size of the parameter length; and
   means for processing the SMS message according to a second format required by a second cellular communication system if the size of the destination address is not less than the size of the parameter length.

16. The apparatus as set forth in claim 15, further comprising means for determining that an SMSC address field is appended to the destination address field.

17. The apparatus as set forth in claim 16, wherein the means for processing the SMS message according to the first format required by a first cellular communication system further comprises means for mapping the SMS message into a new SMS message having the first format, and means for appending the SMSC address field to the new SMS message.

18. The apparatus as set forth in claim 13, wherein processing the SMS message according to the first format required by a first cellular communication system further comprises mapping the SMS message into a new SMS message having the first format, and appending the SMSC address field to the new SMS message.

19. The method as set forth in claim 1, wherein appending or not appending based on the size of the destination address field further comprises appending if the size of the destination address is less than a predetermined length.

20. The method as set forth in claim 1, wherein appending further comprises determining a size of a parameter length in the received SMS information, and wherein appending or not appending based on the size of the destination address field further comprises appending if the size of the destination address is less than the size of the parameter length.

21. The apparatus as set forth in claim 5, wherein the appender/remover element is further configured to append if the size of the destination address is less than a predetermined length.

22. The apparatus as set forth in claim 5, wherein the appender/remover element is further configured to determine a size of a parameter length in the received SMS information, and wherein the appender/remover element is further configured to append if the size of the destination address is less than the size of the parameter length.

23. The apparatus as set forth in claim 9, wherein the means for appending or removing is further configured to append if the size of the destination address is less than a predetermined length.

24. The apparatus as set forth in claim 9, wherein the means for appending or removing is further configured to determine a size of a parameter length in the received SMS information, and wherein the means for appending or removing is further configured to append if the size of the destination address is less than the size of the parameter length.

25. At least one processor for mapping short message service (SMS) information from a first cellular communications system to a corresponding message in a second, different cellular communications system, comprising:
   a first module configured for receiving the SMS information having a format required by the first cellular communications system;
   a second module configured for mapping the SMS information into a format required by the second cellular, communications system; and
   a third module configured for appending additional information to the SMS information, If necessary, or removing extraneous information from the SMS information, if necessary, as required by the second cellular communications system;
   wherein the third module is further configured for determining a size of a destination address field in the received SMS information, and appending or not appending based on the size of the destination address field.

26. module residing in a storage medium for mapping short message service (SMS) information from a first cellular communications system to a corresponding message in a second, different cellular communications system, comprising:
   first information operable to cause a computer to receive the SMS information having a format required by the first cellular communications system;
   second information operable to cause the computer to map the SMS information into a format required by the second cellular communications system; and
   third information operable to cause the computer to append additional information to the SMS information, if necessary, or removing extraneous information from the SMS information, if necessary, as required by the second cellular communications system;
   wherein the third information is further operable to cause the computer to determine a size of a destination address field in the received SMS information, and to append or to not append based on the size of the destination address field.

27. At least one processor for determining how to process an SMS message, comprising:
   a first module for receiving an SMS message;
   a second module for determining the size of a conventional destination address field;
   a third module for determining the size of a parameter length;
   a fourth module for comparing the size of the convention destination address field with the parameter length;
   a fifth module for processing the SMS message according to a first format required by a first cellular communication system if the size of the destination address is less than the size of the parameter length; and
   a sixth module for processing the SMS message according to a second format required by a second cellular communication system if the size of the destination address is not less than the size of the parameter length.

28. A module, residing in a storage Medium. for determining how to process an SMS message, comprising:
   a computer readable medium, comprising:
   first information operable to cause a computer to receive an SMS message; second information operable to cause the computer to determine the size of a conventional destination address field;

third information operable to cause the computer to determine the size of a parameter length;

fourth information operable to cause the computer to compare the size of the convention destination address field with the parameter length;

fifth information operable to cause the computer to process the SMS message according to a first format required by a first cellular communication system if the size of the destination address is less than the size of the parameter length; and sixth information operable to cause the computer to process the SMS message according to a second format required by a second cellular communication system if the size of the destination address is not less than the size of the parameter length.

* * * * *

UNITED STATES PATENT AND TRADEMARK OFFICE
CERTIFICATE OF CORRECTION

| | | |
|---|---|---|
| PATENT NO. | : 7,680,503 B2 | Page 1 of 1 |
| APPLICATION NO. | : 10/421439 | |
| DATED | : March 16, 2010 | |
| INVENTOR(S) | : Jain et al. | |

It is certified that error appears in the above-identified patent and that said Letters Patent is hereby corrected as shown below:

Column 8, line 26, claim 6: "ODMA" to read as --CDMA--

Column 8, line 28, claim 7: "OSM" to read as --GSM--

Column 8, line 59, claim 13: "the size of a conventional" to read as --a size of a conventional--

Column 8, line 61, claim 13: "the size of a parameter" to read as --a size of a parameter--

Column 9, line 10, claim 15: "the size of a conventional" to read as --a size of a conventional--

Column 9, line 11, claim 15: "the size of a parameter" to read as --a size of a parameter--

Column 10, line 12, claim 25: "If necessary" to read as --if necessary--

Column 10, line 21, claim 26: "module residing" to read as --A module, residing--

Column 10, line 21, claim 26: "medium for" to read as --medium, for--

Column 10, line 46, claim 27: "the size of a conventional" to read as --a size of a conventional--

Column 10, line 48, claim 27: "the size of a parameter" to read as --a size of a parameter--

Column 10, line 60, claim 28: "Medium." to read as --medium,--

Column 10, line 62, claim 28: Delete "a computer readable medium, comprising:"

Column 10, line 65, claim 28: "the size" to read as --a size--

Signed and Sealed this
Thirty-first Day of July, 2012

David J. Kappos
*Director of the United States Patent and Trademark Office*